United States Patent

Izumi

(10) Patent No.: US 10,316,973 B2
(45) Date of Patent: Jun. 11, 2019

(54) SEAL RING FOR VEHICLES

(71) Applicant: Honda Motor Co., Ltd., Tokyo (JP)

(72) Inventor: Masao Izumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 156 days.

(21) Appl. No.: 15/438,688

(22) Filed: Feb. 21, 2017

(65) Prior Publication Data

US 2017/0254419 A1 Sep. 7, 2017

(30) Foreign Application Priority Data

Mar. 3, 2016 (JP) .................................. 2016-040582

(51) Int. Cl.
| | |
|---|---|
| *F16J 15/16* | (2006.01) |
| *F16H 57/029* | (2012.01) |
| *F16J 15/3272* | (2016.01) |
| *F16H 57/12* | (2006.01) |

(52) U.S. Cl.
CPC .......... *F16J 15/164* (2013.01); *F16H 57/029* (2013.01); *F16H 57/12* (2013.01); *F16J 15/3272* (2013.01)

(58) Field of Classification Search
CPC ........ F16J 15/164; F16J 15/3272; F16J 15/00; F16H 57/029; F16H 15/12; F16H 57/00
USPC ........................................................ 277/361
See application file for complete search history.

(56) References Cited

U.S. PATENT DOCUMENTS

| | | | | | |
|---|---|---|---|---|---|
| 2,331,908 | A | * | 10/1943 | Henningsen ............ | F16D 41/22 180/249 |
| 5,018,753 | A | * | 5/1991 | Porel ........................ | F16J 15/32 277/589 |
| 2005/0116426 | A1 | * | 6/2005 | Watanabe .................. | F16J 9/14 277/419 |
| 2008/0041654 | A1 | * | 2/2008 | Raue .................... | B60K 7/0007 180/346 |
| 2008/0314581 | A1 | * | 12/2008 | Brown .................. | E21B 43/127 166/105 |

FOREIGN PATENT DOCUMENTS

| | | |
|---|---|---|
| CN | 202927030 U | 5/2013 |
| JP | H0612872 U | 2/1994 |
| JP | 2014169709 A | 9/2014 |
| WO | 03078873 A1 | 9/2003 |

* cited by examiner

*Primary Examiner* — Nathan Cumar
(74) *Attorney, Agent, or Firm* — Duft & Bornsen, PC (57) ABSTRACT

A seal ring for vehicles includes a first ring accommodated in an annular groove formed in a peripheral surface of one of a rotating shaft and housing and including a first peripheral surface sealingly contacting with a bottom surface of a annular groove and a second ring including a second peripheral surface sealingly contacting with a peripheral surface of the other of the rotating shaft and the housing. The first and second rings respectively include a first and second facing surfaces at opposite sides of the first and second peripheral surfaces in a radial direction, one of the first and second facing surfaces includes a convex portion, and the other of the first and second facing surfaces includes a concave portion engaging the convex portion.

6 Claims, 8 Drawing Sheets

LEFT ←――→ RIGHT

FIG. 10B

LEFT ←――→ RIGHT

SEAL RING FOR VEHICLES

CROSS-REFERENCE TO RELATED APPLICATION

This application is based upon and claims the benefit of priority from Japanese Patent Application No. 2016-040582 filed on Mar. 3, 2016, the content of which is incorporated herein by reference.

BACKGROUND OF THE INVENTION

Field of the Invention

This invention relates to a seal ring for vehicles used for a vehicle transmission and so on.

Description of the Related Art

Conventionally, various seal rings for sealing an annular gap between a rotating shaft and a housing have been proposed. For example, International Publication No. 2003/078873 (WO2003/078873A) describes a seal ring of substantially rectangular cross-sectional shape adapted to enhance sealing performance at a single incision in the circumferential direction. The seal ring described in WO2003/078873A is accommodated in an annular groove formed in the outer peripheral surface of the rotating shaft and a side surface of the seal ring is pushed against a side surface of the annular groove by the pressure of oil in a sealed space, thereby preventing leaking of oil.

However, when no oil pressure acts on the sealed space, such as when an associated engine stops, any axial direction movement of the rotating shaft relative to the housing allows a gap to form between the side surface of the housing and the side surface of the seal ring, so that oil is apt to flow out of the sealed space through the gap.

SUMMARY OF THE INVENTION

According to an aspect of the present invention, a seal ring for vehicles, for sealing an annular gap between a rotating shaft and a housing, includes: a first ring accommodated in an annular groove formed in a peripheral surface of one of the rotating shaft and the housing and comprising a first peripheral surface sealingly contacting with a bottom surface of the annular groove; and a second ring comprising a second peripheral surface sealingly contacting with a peripheral surface of the other of the shaft and the housing, wherein the first ring comprises a first facing surface at an opposite side of the first peripheral surface in a radial direction, the second ring comprises a second facing surface at an opposite side of the second peripheral surface in the radial direction, and the first facing surface and the second facing surface face each other, and wherein one of the first facing surface and the second facing surface comprises a convex portion, and the other of the first facing surface and the second facing surface comprises a concave portion engaging the convex portion.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
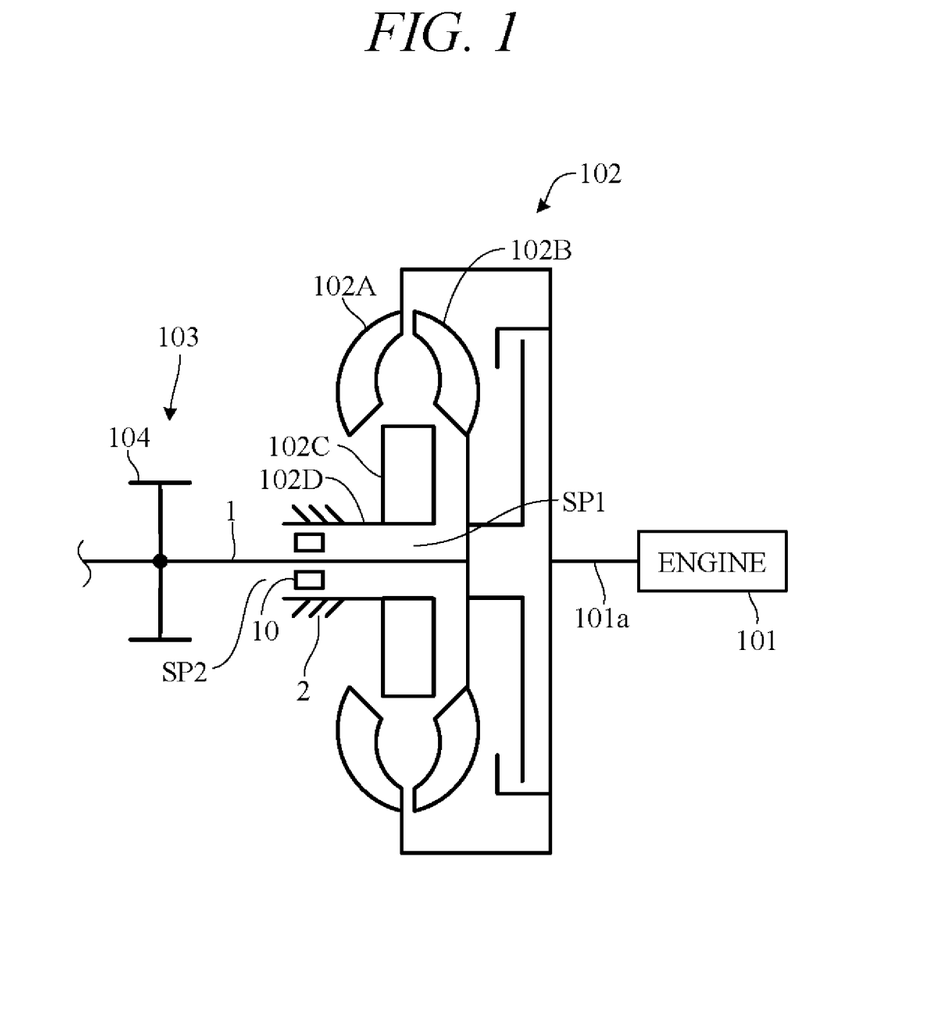
FIG. 1 is a diagram showing schematically part of a configuration of a transmission to which a seal ring for vehicles according to an embodiment of the present invention is applied.

Hereinafter, an embodiment of the present invention is explained with reference to FIGS. 1 to 10. The seal ring according to the embodiment of the present invention is used in a vehicle transmission. FIG. 1 is a diagram showing schematically part of a transmission structure and conceptually illustrating an example of seal ring application.

As shown in FIG. 1, torque of an engine 10 is input through a torque converter 102 to a transmission 103. The torque converter 102 has a pump impeller 102A connected to an output shaft (crankshaft) 101a of an engine 101, a turbine runner 102B connected to a rotating shaft (input shaft) 1 of the transmission 103, and a stator 102C situated between the pump impeller 102A and the turbine runner 102B. The stator 102C is supported through a stator shaft 102D by a housing (transmission case) 2.

When the pump impeller 102A rotates with rotation of the output shaft 101a of the engine 101, oil propelled by the pump impeller 102A flows into and drives the turbine runner 102B, whereafter it passes through the stator 102C and returns to the pump impeller 102A. As a result, rotation of the output shaft 101a reduced in speed and increased in torque is input to the rotating shaft 1 of the transmission 103. The rotating shaft 1 is provided with multiple gears 104 (only one shown), and the torque input to the rotating shaft 1 is transmitted to drive wheels (not shown) while being speed and torque regulated by the gears 104, thereby propelling the vehicle. The multiple gears 104 include helical gears which generate thrust torque in the axial direction.

Although not shown in the drawings, the transmission 103 has a parking gear and a parking lock mechanism which meshes with the parking gear through a gear mechanism. The parking lock mechanism has a locking pawl and an engaging groove engageable by the locking pawl, and rotation of the rotating shaft 1 is locked by engagement of the locking pawl with the engaging groove. The parking lock mechanism operates to engage the locking pawl with the engaging groove when P range is selected by operation of a shifter capable of selecting one among, for example, P, D, L, S and N ranges. On the other hand, when a range other than P range is selected by operation of the shifter, the parking lock mechanism is disabled and engagement of the locking pawl is released.

A seal ring 10 is interposed between an inner peripheral surface of the housing 2 and an outer peripheral surface of the rotating shaft 1. The seal ring 10 prevents leaking of oil from a first space SP1 on one axial direction side (torque converter side) to a second space SP2 on another axial direction side.

Figure 2A:
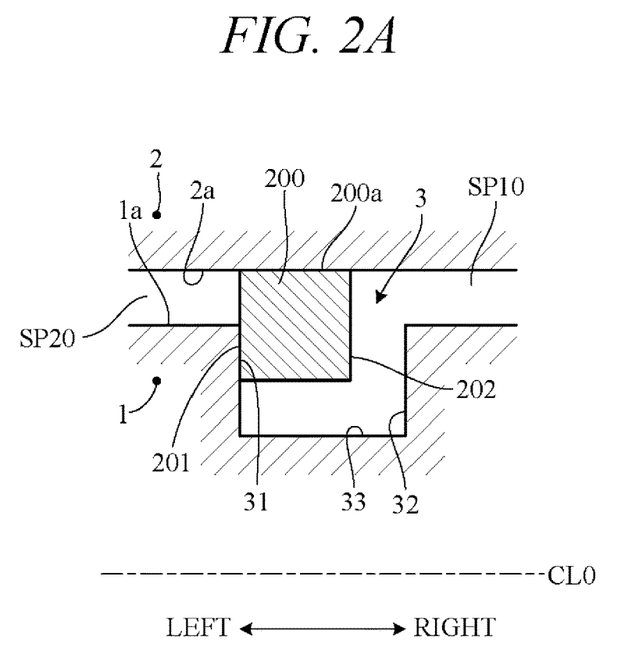
FIG. 2A is a cross-sectional diagram showing a configuration of a seal ring for vehicles as a comparative example of the present embodiment.

The seal ring structure is explained next, beginning with an explanation of a comparative example of the seal ring 10 according to the embodiment of the present invention. FIG. 2A is a cross-sectional diagram showing the structure of a seal ring 200 which is a comparative example of the present embodiment. The seal ring 200 has an incision at a single location in the circumferential direction, and FIG. 2A shows the cross-sectional shape of the seal ring 200 at a location other than the site of the incision. For convenience in the following, direction of an axis CL0, which is the rotational axis of the rotating shaft 1, is defined as lateral (left-right) direction. Between an outer peripheral surface 1a of the rotating shaft 1 and an inner peripheral surface 2a of the housing 2, an annular gap SP10 communicating with the first space SP1 is formed on the right side of the seal ring 200 and an annular gap SP20 communicating with the second space SP2 is formed on the left side of the seal ring 200.

As shown in FIG. 2A, a groove 3 is formed in and completely around the cylindrically shaped outer peripheral surface 1a of the rotating shaft 1 centered on the axis CL0. The groove 3 is of substantially rectangular cross-sectional shape and has a left end face 31 and a right end face 32, both of which extend radially, and a bottom surface 33 of cylindrical shape. The seal ring 200 fits in the groove 3. The seal ring 200 expands in diameter under its own elastic force so as to push its outer peripheral surface 200a against the inner peripheral surface 2a of the housing 2. This closes the gap between the outer peripheral surface 200a of the seal ring 200 and the inner peripheral surface 2a of the housing 2.

Hydraulic oil delivered by a hydraulic pump driven by the engine 101 is introduced into the first space SP1 on the right side of the seal ring 200, so that pressure on the right side of the seal ring 200 in communication with the annular gap SP10 becomes higher than pressure on the left side in communication with the annular gap SP20. At this time, the seal ring 200 is pushed leftward while sliding on the inner peripheral surface 2a of the housing 2. A left end face 201 of the seal ring 200 therefore sealingly contacts the left end face 31 of the groove 3 to close the gap between the end faces 31 and 201, as shown in FIG. 2A.

Figure 2B:
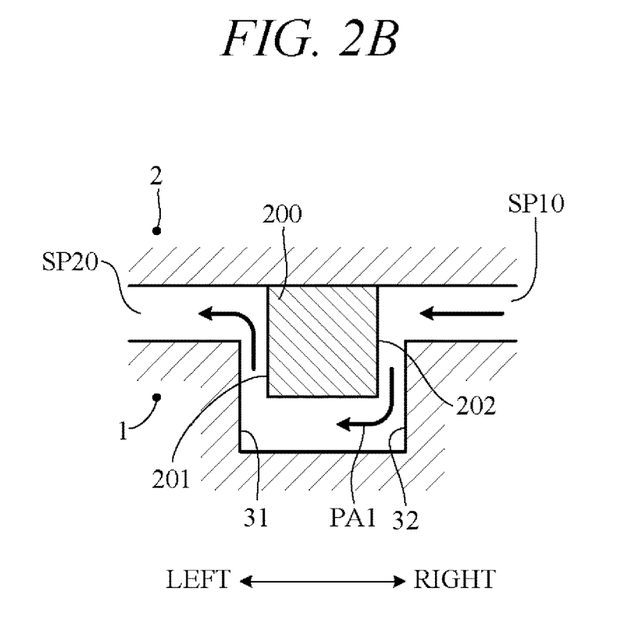
FIG. 2B is a diagram showing an example of an operation of the seal ring in FIG. 2A.

FIG. 2B shows an example of seal ring 200 behavior, specifically of its behavior in the case of stopping the engine 101 and operating the parking lock mechanism to park a vehicle on a sloping road. At the time of parking on a slope, the parking gear rotates minutely because the vehicle moves slightly under its own weight owing to, for example, looseness between the locking pawl and the engaging groove. Therefore, since the rotating shaft 1 may rotate, there is a possibility that the rotating shaft 1 moves in the axial direction relative to the housing 2 through the helical gears. Since the engine is stopped and no hydraulic oil is delivered from the hydraulic pump at this time, no pushing force owing to hydraulic pressure acts from the right side toward the left side of the seal ring 200.

Therefore, as shown in FIG. 2B, the position of the seal ring 200 in the axial direction remains unchanged and only the rotating shaft 1 moves axially, so that gaps are apt to arise in the axial direction between the left and right end faces 201 and 202 of the seal ring 200 and the left and right end faces 31 and 32 of the groove 3. As indicated by the arrow-marked path PA1 in FIG. 2B, the occurrence of such gaps allows oil to flow from the first space SP1 to the second space SP2 via the annular gaps SP10 and SP20, so that the amount of oil in the first space SP1 becomes deficient. As a result, driving and starting performance and the like may be adversely affected when the vehicle is driven after engine starting.

Therefore, in the present embodiment, the seal ring 10 is configured as set out below in order to prevent leaking of oil from the first space SP1 to the second space SP2 when the engine 101 is stopped and the vehicle parked on a sloping road, and in similar cases.

Figure 3:
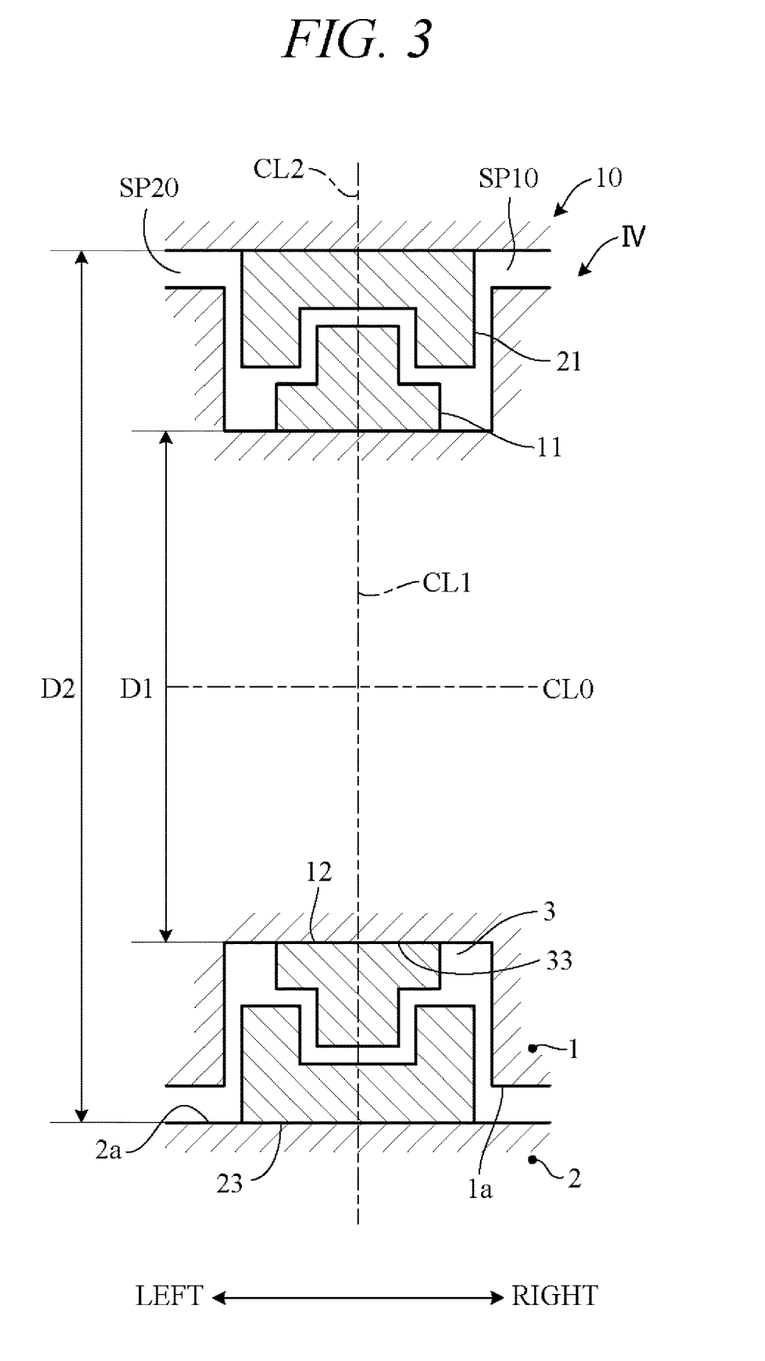
FIG. 3 is a cross-sectional diagram showing a main configuration of the seal ring according to the embodiment of the present invention.

FIG. 3 is a cross-sectional diagram showing main configurations of the seal ring 10 in accordance with the embodiment of the present invention. FIG. 3 also shows part of the rotating shaft 1 and the housing 2. The structures of the rotating shaft 1 and housing 2 are the same as those shown in FIG. 2A.

As shown in FIG. 3, the seal ring 10 has a radially inner ring 11 and a radially outer ring 21, both of annular shape concentric with the axis CL0. In other words, the seal ring 10 has a radially split two-piece structure. The radially inner ring 11 and radially outer ring 21 are, for example, respectively constituted of metal having elasticity and cut at one location in the circumferential direction so as to be expandable and contractible by elastic deformation. In FIG. 3, a center line CL1 perpendicular to the axis CL0 and passing through the lateral direction (left-right direction) center of the radially inner ring 11 and a center line CL2 perpendicular to the axis CL0 and passing through the lateral direction (left-right direction) center of the radially inner ring 21 are shown in a coincident state.

Figure 4:
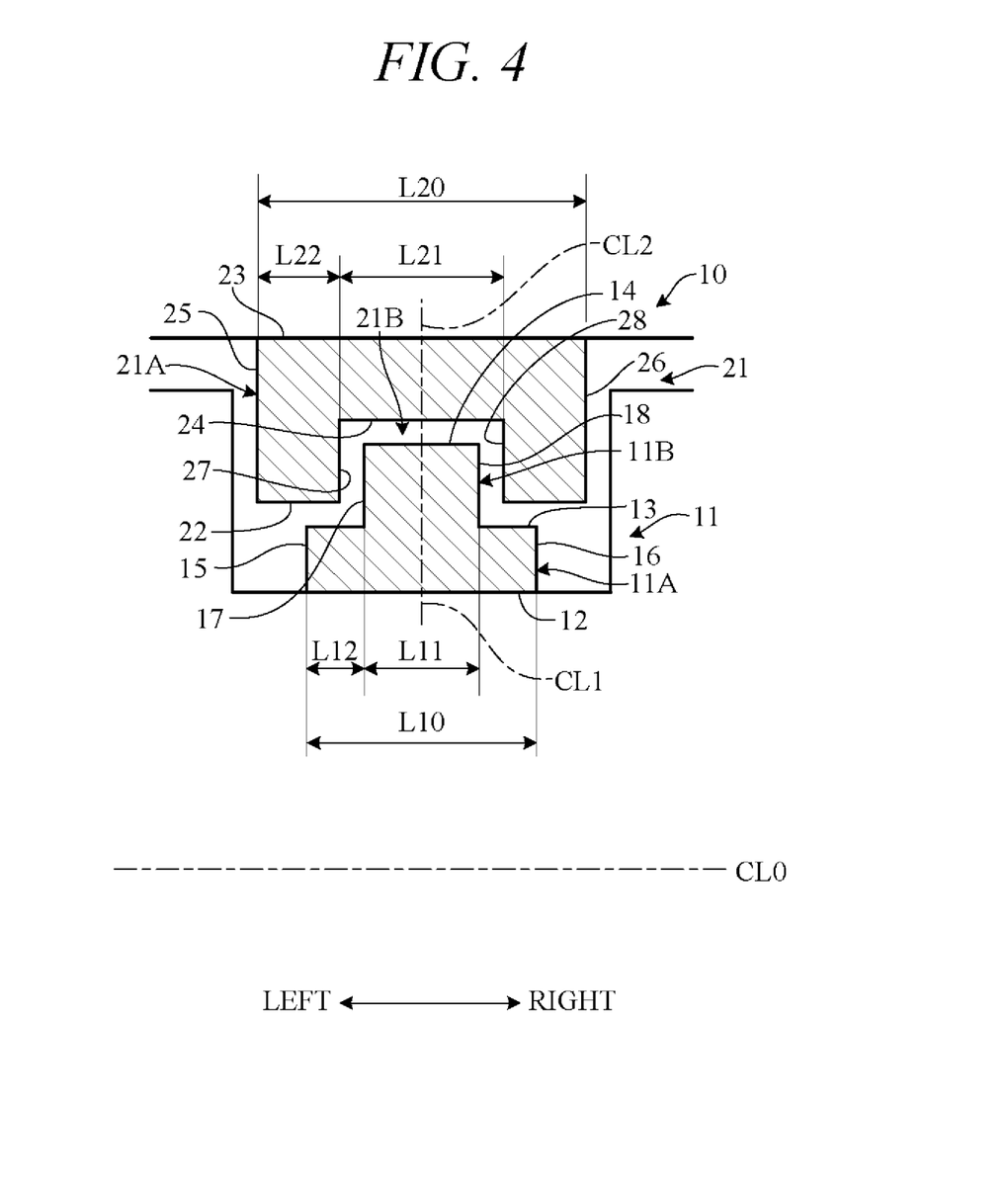
FIG. 4 is an enlarged view of a portion IV in FIG. 3.

FIG. 4 is an enlarged view of a portion IV in FIG. 3. As shown in FIG. 4, the radially inner ring 11 includes a ring portion 11A having an inner peripheral surface 12 and an outer peripheral surface 13, both of substantially cylindrical shape concentric with the axis CL0, and a protruded portion 11B of substantially rectangular cross-sectional shape erected on the outer peripheral surface 13 of the ring portion 11A to protrude radially outward and have an outer peripheral surface 14 of substantially cylindrical shape concentric with the axis CL0. The ring portion 11A and the protruded portion 11B have respective left-right lateral end surfaces 15 and 16 and left-right lateral end surfaces 17 and 18 which extend perpendicular to the axis CL0. The lateral end surfaces 15 and 16 and the lateral end surfaces 17 and 18 are positioned laterally symmetrical with respect to the center line CL1 of the radially inner ring 11, and the radially inner ring 11 is as a whole shaped laterally symmetrical with respect to the center line CL1.

The radially outer ring 21 includes an annular ring portion 21A having an inner peripheral surface 22 and an outer peripheral surface 23, both of substantially cylindrical shape concentric with the axis CL0, and a recessed portion 21B formed in the inner peripheral surface 22 of the ring portion 21A. The recessed portion 21B has a bottom surface 24 (outer peripheral surface) of substantially cylindrical shape concentric with the axis CL0, and is formed substantially rectangular in cross-section. The ring portion 21A and the recessed portion 21B have respective lateral end surfaces 25 and 26 and lateral end surfaces 27 and 28 which extend perpendicular to the axis CL0. The lateral end surfaces 25 and 26 and the lateral end surfaces 27, 28 are positioned laterally symmetrical with respect to the center line CL2 of the radially outer ring 21, and the radially outer ring 21 is as a whole shaped laterally symmetrical with respect to the center line CL2.

Where, as indicated in FIG. 4, distance between the lateral end surfaces 17 and 18 of the protruded portion 11B of the radially inner ring 11 is defined as L11 and distance between the lateral end surfaces 27 and 28 is defined as L21, the protruded portion 11B of the radially inner ring 11 is enabled to engage (fit into) the recessed portion 21B of the radially outer ring 21 by defining L11<L21. Where distance between the lateral end surfaces 15 and 16 of the ring portion 11A of the radially inner ring 11 is defined as L10, lengths L12 of end sections from the lateral end surface 15 to the lateral end surface 17 and from the lateral end surface 16 to the lateral end surface 18 are defined as (L10-L11)/2. Further, where distance between the lateral end surfaces 25 and 26 of the ring portion 21A of the radially outer ring 21 is defined as L20, lengths L22 of end sections from the lateral end surface 25 to the lateral end surface 27 and from the lateral end surface 26 to the lateral end surface 28 are defined as (L20-L21)/2. Lengths L12 of the end sections of the radially inner ring 11 are shorter than lengths L22 of the end sections of the radially outer ring 21.

Figure 5A:
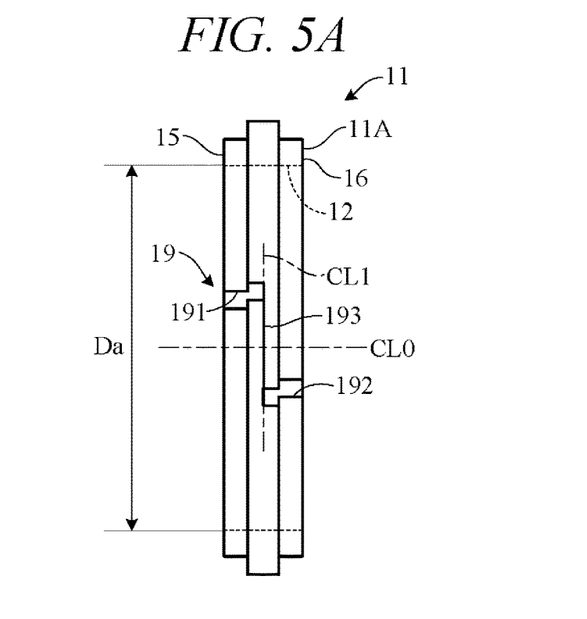
FIG. 5A is a front view showing a configuration of an incision of a radially inner ring constituting part of the seal ring in FIG. 3.
Figure 5B:
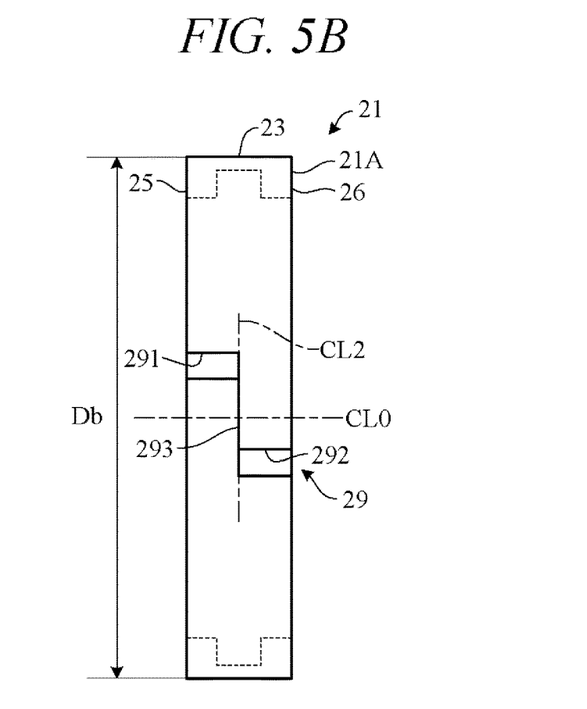
FIG. 5B is a front view showing a configuration of an incision of a radially outer ring constituting part of the seal ring in FIG. 3.

FIG. 5A is a front view showing the configuration of an incision 19 of the radially inner ring 11 (as seen from radially outside), and FIG. 5B is a front view showing the configuration of an incision 29 of the radially outer ring 21 (as seen from radially outside).

As shown in FIG. 5A, the incision 19 has a cut face 191 extending parallel to the axis CL0 from the left end surface 15 of the ring portion 11A to the center line CL1, a cut face 192 extending parallel to the axis CL0 from the right end surface 16 of the ring portion 11A to the center line CL1 at a position phase-shifted circumferentially with respect to the cut face 191 by a predetermined angle, and a cut face 193 extending along the center line CL1 and connecting the right end surface of the cut face 191 and the left end surface of the cut face 192. In the example of FIG. 5A, although the cut faces 191 and 192 extend not straight but concavely to the center line CL1, they can alternatively extend not concavely straight.

Diameter Da of the inner peripheral surface 12 of the ring portion 11A in a state of no expanding direction external force acting on the radially inner ring 11 is smaller than diameter D1 of a bottom surface of the groove 3 (FIG. 3). Therefore, when the radially inner ring 11 is elastically deformed and fit in the groove 3, as shown in FIG. 3, the elastic force of the radially inner ring 11 produces its own pushing force (called "inward tensile force") which acts from the inner peripheral surface 12 of the radially inner ring 11 onto the bottom surface 33 of the groove 3, thereby pushing the surfaces 12 and 33 into sealing contact with each other.

As shown in FIG. 5B, the incision 29 has a cut face 291 extending parallel to the axis CL0 from the left end surface 25 of the ring portion 21A to the center line CL2, a cut face 292 extending parallel to the axis CL0 from the right end surface 26 of the ring portion 21A to the center line CL2 at a position phase-shifted circumferentially with respect to the cut face 291 by a predetermined angle, and a cut face 293 extending along the center line CL2 and connecting the right end surface of the cut face 291 and the left end surface of the cut face 292.

Diameter Db of the outer peripheral surface 23 of the ring portion 21A in a state of no external force acting on the radially outer ring 21 is larger than diameter D2 of the inner peripheral surface 2a of the housing 2 (FIG. 3). Therefore, when the radially outer ring 21 is elastic deformed and fit inside the housing 2, as shown in FIG. 3, the elastic force of the radially outer ring 21 produces its own pushing force (called "outward tensile force") which acts from the outer peripheral surface 23 of the radially outer ring 21 onto the inner peripheral surface 2a of the housing 2, thereby pushing the surfaces 2a and 23 into sealing contact with each other.

Figure 6:
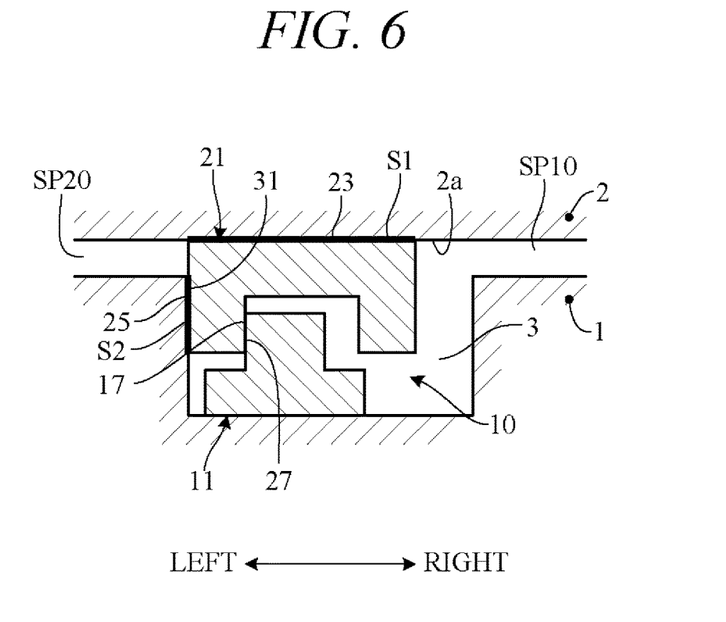
FIG. 6 is a diagram showing an example of a first operation of the seal ring according to the embodiment of the present invention.

An explanation of main operations of the vehicle seal ring 10 according to this embodiment of the present invention follows. FIG. 6 is a diagram showing an example of operational behavior of the seal ring 10 at engine starting. During engine starting, hydraulic oil delivered from the hydraulic pump is introduced into the first space SP1 and raises the hydraulic pressure of the first space SP1 to higher than the pressure of the second space SP2. Hydraulic force acting through the annular gap SP10 therefore pushes both the radially inner ring 11 and the radially outer ring 21 leftward, so that the left end surface 17 of the protruded portion 11B of the radially inner ring 11 is pushed onto the left end surface 27 of the recessed portion 21B of the radially outer ring 21. Further, since the lengths L12 of end sections of the radially inner ring 11 are shorter than the lengths L22 of the end sections of the radially outer ring 21 (FIG. 4), the left end surface 25 of the radially outer ring 21 is pushed onto the left end face 31 of the groove 3. In addition, elastic force of the radially outer ring 21 pushes the outer peripheral surface 23 of the radially outer ring 21 onto the inner peripheral surface 2a of the housing 2.

Therefore, the left end surface 25 of the radially outer ring 21 sealingly contacts the left end face 31 of the groove 3, thereby closing the gap between the surfaces 25 and 31. In addition, the outer peripheral surface 23 of the radially outer ring 21 sealingly contacts the inner peripheral surface 2a of the housing 2, thereby closing the gap between the surfaces 2a and 23. As a result, communication between the annular gap SP10 and the annular gap SP20 is cut off by the seal ring 10, whereby the first space SP1 is sealed from the second space SP2. At this time, the outer peripheral surface 23 and the left end surface 25 of the radially outer ring 21 function as sealing surfaces S1 and S2 for closing the oil passage between the annular gaps SP10 and SP20.

Figure 7:
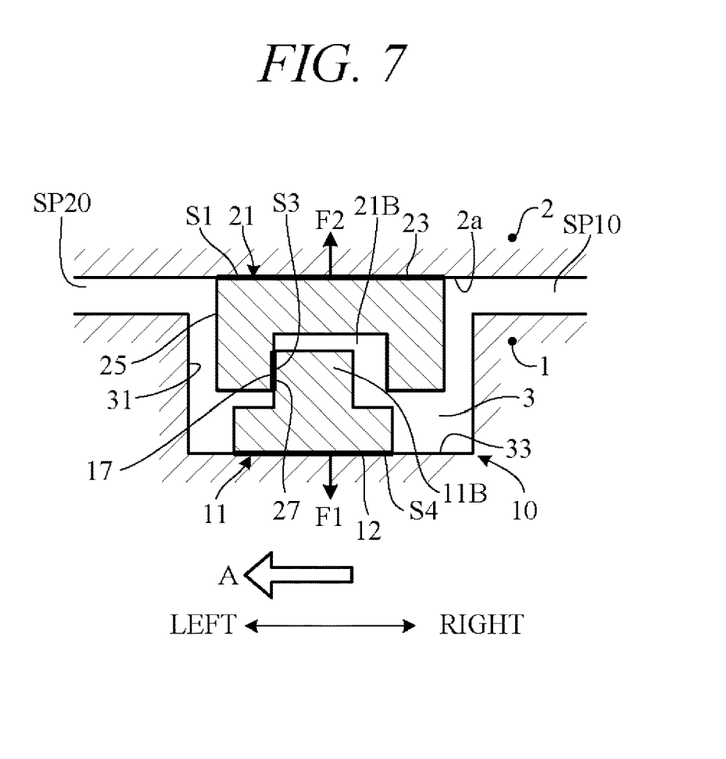
FIG. 7 is a diagram showing an example of a second operation of the seal ring according to the embodiment of the present invention.

FIG. 7 is a diagram showing an example of operational behavior when stopping of the engine causes the rotating shaft 1 to move from the state of FIG. 6 leftward (arrow A direction) relative to the housing 2. The example of operational behavior in FIG. 7 is that in a case where outward tensile force F2 is greater than inward tensile force F1, i.e., in a case where frictional force between the outer peripheral surface 23 of the radially outer ring 21 and the inner peripheral surface 2a of the housing 2 is greater than frictional force between the inner peripheral surface 12 of the radially inner ring 11 and the bottom surface 33 of the groove 3.

As shown in FIG. 7, when the rotating shaft 1 moves leftward after the engine stops, the inner peripheral surface 12 of the radially inner ring 11 slides relative to the bottom surface 33 of the groove 3, whereby the positional relation of the seal ring 10 with respect to the annular groove 3 changes. Specifically, the rotating shaft 1 moves leftward relative to the seal ring 10 and a gap forms between the left end face 31 of the groove 3 and the left end surface 25 of the radially outer ring 21.

At this time, although hydraulic force stops acting on the right side of the seal ring 10, the radially inner ring 11 is pushed leftward by frictional force from the bottom surface 33 of the groove 3. Therefore, the left end surface 17 of the protruded portion 11B sealingly contacts the left end surface 27 of the recessed portion 21B, thereby closing the axial direction gap between the protruded portion 11B and the recessed portion 21B. As a result, oil can be prevented from leaking from the first space SP1 to the second space SP2 when the engine 101 is stopped on a sloping road or the like. At this time, the outer peripheral surface 23 of the radially outer ring 21, the abutting surfaces of the protruded portion 11B and the recessed portion 21B (end surfaces 17 and 27), and the inner peripheral surface 12 of the radially inner ring 11 constitute sealing surfaces S1, S3 and S4, respectively.

Figure 8:
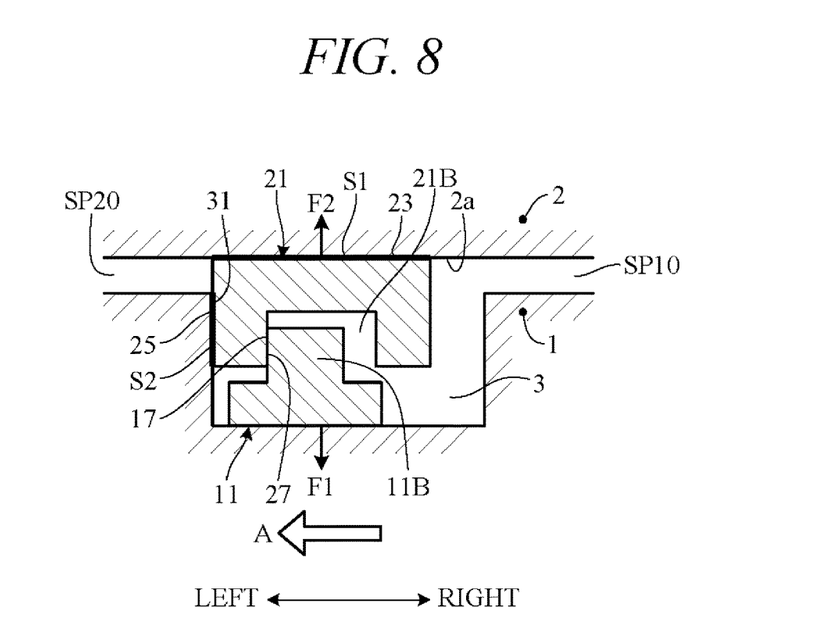
FIG. 8 is a diagram showing an example of a third operation of the seal ring according to the embodiment of the present invention.

FIG. 8 is a diagram showing an example of operational behavior when, differently from in the example of FIG. 7, the inward tensile force F1 is greater than the outward tensile force F2, i.e., in a case where frictional force between the inner peripheral surface 12 of the radially inner ring 11 and the bottom surface 33 of the groove 3 is greater than frictional force between the outer peripheral surface 23 of the radially outer ring 21 and the inner peripheral surface 2a of the housing 2. In this case, when the rotating shaft 1 moves leftward (arrow A direction) after the engine stops, the radially inner ring 11 moves leftward together with the rotating shaft 1 and pushing force from the protruded portion 11B of the radially inner ring 11 acts leftward on the recessed portion 21B of the radially outer ring 21.

Therefore, as shown in FIG. 8, the radially outer ring 21 moves leftward together with the radially inner ring 11 while the outer peripheral surface 23 slides along the inner peripheral surface 2a of the housing 2. Thus, the seal ring 10 can maintain sealing state with no formation of a gap between the left end face 31 of the groove 3 and the left end surface 25 of the radially outer ring 21. At this time, similarly to what is shown in FIG. 6, the outer peripheral surface 23 and the left end surface 25 of the radially outer ring 21 constitute sealing surfaces S1 and S2, respectively.

Figure 9:
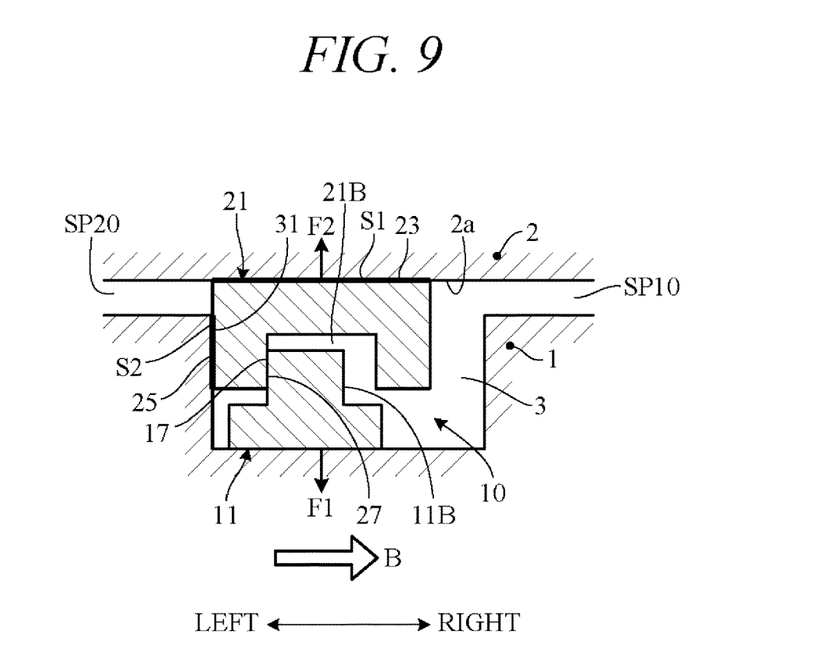
FIG. 9 is a diagram showing an example of a fourth operation of the seal ring according to the embodiment of the present invention.

FIG. 9 is a diagram showing an example of operational behavior when the rotating shaft 1 moves rightward (arrow B direction) relative to the housing 2 after the engine stops. The operational behavior illustrated in FIG. 9 is relevant to both the case of the outward tensile force F2 being greater than the inward tensile force F1 and the case of the inward tensile force F1 being greater than outward tensile force F2.

As shown in FIG. 9, when the rotating shaft 1 moves rightward after the engine stops in a state where, for example, inward tensile force F1 is greater than outward tensile force F2, pushing force from the left end face 31 of the groove 3 acts rightward on the left end surface 25 of the radially outer ring 21, whereby the outer peripheral surface 23 of the radially outer ring 21 slides along the inner peripheral surface 2a of the housing 2. So the seal ring 10 moves rightward together with the rotating shaft 1, with the protruded portion 11B (left end surface 17) of the radially inner ring 11 and the recessed portion 21B (left end surface 27) of the radially outer ring 21 remaining in sealing contact. Therefore, the axial direction gap between the groove 3 and the radially outer ring 21 remains closed, so that the seal ring 10 can maintain the sealed state. At this time, similarly to what is shown in FIG. 6, the outer peripheral surface 23 and the left end surface 25 of the radially outer ring 21 constitute sealing surfaces S1 and S2, respectively.

Similarly, when the rotating shaft 1 moves rightward after the engine stops in a state where outward tensile force F2 is greater than inward tensile force F1, pushing force from the left end face 31 of the groove 3 acts rightward on the left end surface 25 of the radially outer ring 21, whereby the outer peripheral surface 23 of the radially outer ring 21 slides along the inner peripheral surface 2a of the housing 2. So the seal ring 10 moves rightward together with the rotating shaft 1, with the protruded portion 11B of the radially inner ring 11 and the recessed portion 21B of the radially outer ring 21 remaining in sealing contact, whereby the sealed state between the groove 3 and the radially outer ring 21 can be maintained.

The present embodiment can achieve advantages and effects such as the following:

(1) The seal ring 10 for sealing the annular gaps SP10 and SP20 between the rotating shaft 1 and the housing 2 includes the radially inner ring 11, which is accommodated in the annular groove 3 formed in the outer peripheral surface 1a of the rotating shaft 1 and has the inner peripheral surface 12 which sealingly contacts the bottom surface 33 of the groove 3, and the radially outer ring 21, which has the outer peripheral surface 23 which sealingly contacts the inner peripheral surface 2a of the housing 2 (FIG. 3). The radially inner ring 11 and radially outer ring 21 includes the mutually opposed outer peripheral surface 13 and inner peripheral surface 22, and the outer peripheral surface 13 is provided with the protruded portion 11B and the inner peripheral surface 22 with the recessed portion 21B which engages the protruded portion 11B (FIG. 4).

Since the seal ring 10 is split into two pieces in the radial direction and the mutually opposed outer peripheral surface 13 of the radially inner ring 11 and inner peripheral surface 22 of the radially outer ring 21 are respectively provided with the protruded portion 11B and the recessed portion 21B in this manner, the protruded portion 11B and recessed portion 21B abut each other in the axial direction to form the sealing surface S3 (FIG. 7) when the rotating shaft 1 moves in the axial direction relative to the housing 2 after the engine stops, thereby enabling the seal ring 10 to maintain good sealing performance. Therefore, outflow of oil from the first space SP1 can be prevented and good driving and starting performance of the vehicle after engine starting is ensured.

(2) The radially inner ring 11 and the radially outer ring 21 respectively includes the lateral end surface 17 (abutting surface) of the protruded portion 11B and the lateral end surface 27 (abutting surface) of the recessed portion 21B which abut each other by fluid pressure acting in axial direction pressure from fluid (oil), and distance L22 from the lateral end surface 27 of the recessed portion 21B of the radially outer ring 21 to the axial direction end surface of the radially outer ring 21 (lateral end surface 25) is longer than distance L12 from the lateral end surface 17 of the protruded portion 11B of the radially inner ring 11 to the axial direction end surface of the radially inner ring 11 (lateral end surface 15) (FIG. 4). This prevents occurrence of an axial direction gap between the radially inner ring 11 and the radially outer ring 21 owing to relative movement of the rotating shaft 1.

Figure 10A:
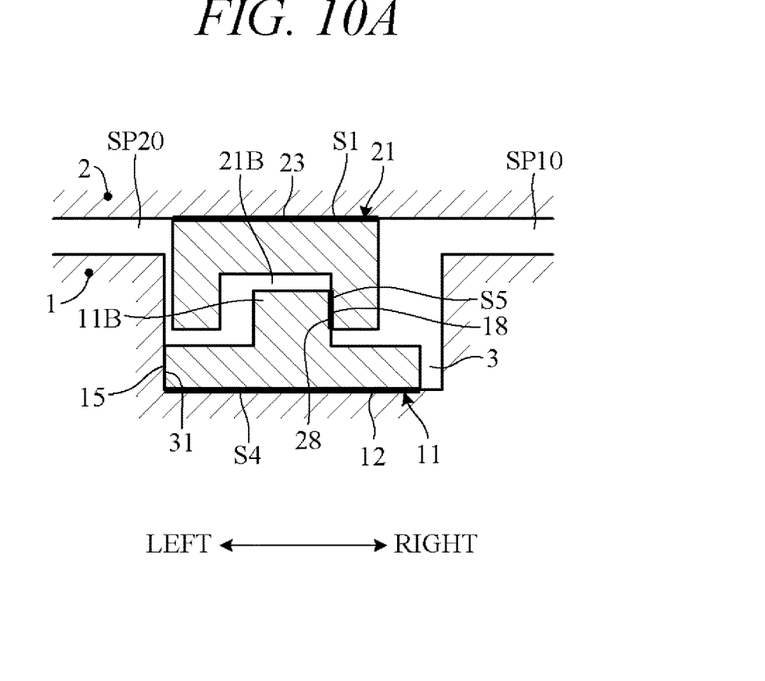
FIG. 10A is a diagram showing a seal ring for vehicles as a comparative example of FIG. 6.

Should length L22 of the end section of the radially outer ring 21 be shorter than length L12 of the end section of the radially inner ring 11, as shown in FIG. 10A, oil pressure introduced through the annular gap SP10 during engine operation would cause the left lateral end surface 15 of the radially inner ring 11 to abut the left lateral end face 31 of the groove 3. At this time, the outer peripheral surface 23 of the radially outer ring 21, the inner peripheral surface 12 of the radially inner ring 11, and the mutually abutting right end surfaces 18 and 28 of the protruded portion 11B and the recessed portion 21B constitute sealing surfaces S1, S4, and S5, respectively.

Figure 10B:
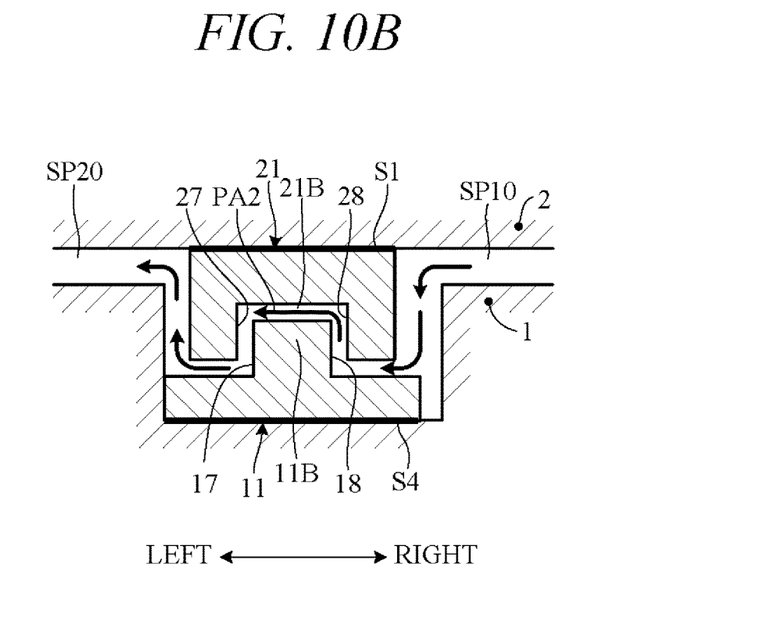
FIG. 10B is a diagram showing an example of an operation of the seal ring in FIG. 10A.

When, as shown in FIG. 10B, for example, the rotating shaft 1 moves leftward from this state together with the radially inner ring 11 after the engine stops, the left lateral end surface 17 and right lateral end surface 18 of the protruded portion 11B respectively separate from the left lateral end surface 27 and right lateral end surface 28 of the recessed portion 21B. Since this causes a passage to form between the radially inner ring 11 and the radially outer ring 21, as indicated by arrow PA2 in FIG. 10B, oil of the first space SP1 is apt to flow out along the passage indicated by arrow PA2 into the second space SP2. The present embodiment deals with this issue by defining the relation between length L12 of the end section of the radially inner ring 11 and the length L22 of the end section of the radially outer ring 21 as L12<L22, thereby reliably preventing outflow of oil from the first space SP1 after the engine stops by ensuring that the protruded portion 11B of the radially inner ring 11 and the recessed portion 21B of the radially outer ring 21 are constantly abutted in the axial direction.

(3) The rotating shaft 1 is a component of the transmission 103 provided with multiple gears 104, some of which are bevel gears (FIG. 1). Although likelihood of the rotating shaft 1 moving axially relative to the housing 2 after the engine stops become high with such a structure, use of the seal ring 10 of the present embodiment ensures maintenance of good sealing property even after engine stopping.

The above embodiment can be variously modified. Some are explained in the following. In the above embodiment, although the protruded portion (convex portion) 11B is provided on the outer peripheral surface 13 of the ring portion 11A of the radially inner ring 11 and the recessed portion (concave portion) 21B is provided in the inner peripheral surface 22 of the ring portion 21A of the radially outer ring 21, oppositely from this, a concave portion can instead be provided in the outer peripheral surface 13 of the radially inner ring 11 and a convex portion be provided on the inner peripheral surface 22 of the radially outer ring 21. In other words, configurations of a concave portion and a convex portion are not limited to that described in the foregoing insofar as the convex portion is provided on one of a first facing surface and a second facing of a pair of rings mutually facing in the axial direction (first ring and second ring) and the concave portion is formed in the other thereof.

In the above embodiment, the annular groove 3 is formed in the outer peripheral surface 1a of the rotating shaft 1 and the radially inner ring 11 is accommodated in sealing contact with the bottom surface 33 of the annular groove 3. However, the annular groove can instead be formed in the inner peripheral surface 2a of the housing 2 and the radially outer ring 21 be accommodated in sealing contact with the bottom surface of the annular groove. In other words, configurations of a rotating shaft and a housing are not limited to that described in the foregoing insofar as an annular groove is formed in the peripheral surface of one of the rotating shaft 1 and the housing 2, one of the radially inner ring 11 and the radially outer ring 21 is as a first ring sealingly contacted by a peripheral surface thereof (a first peripheral surface) with the bottom surface of the annular groove, and the other of the radially inner ring 11 and the radially outer ring 21 is as a second ring sealingly contacted by a peripheral surface thereof (a second peripheral surface) with the peripheral surface of the other of the rotating shaft 1 and the housing 2. In the above embodiment, although the seal ring 10 is configured symmetrically in the left-right direction, the first ring and the second ring can instead be configured laterally asymmetrical and the configuration of the seal ring is not limited to that described in the foregoing.

In the above embodiment, the seal ring 10 is utilized in an annular groove between the rotating shaft 1, which is a component of the transmission 103, and the housing 2 thereof. However, the vehicle seal ring of the present invention can be applied not only to a rotating shaft of a transmission but can also similarly be applied at other sites where a rotating shaft moves axially relative to a housing.

The above embodiment can be combined as desired with one or more of the aforesaid modifications. The modifications can also be combined with one another.

According to the present invention, a seal ring for vehicles includes a first ring and a second ring, and one of a first facing surface of the first ring and a second facing surface of the second ring facing the first facing surface includes a convex portion and the other of the first facing surface and the second facing surface includes a concave portion engaging the convex portion. Therefore, even if the rotating shaft moves in the axial direction relative to the housing after the engine is stopped, the seal ring can maintain good sealing performance.

Above, while the present invention has been described with reference to the preferred embodiments thereof, it will be understood, by those skilled in the art, that various changes and modifications may be made thereto without departing from the scope of the appended claims.

What is claimed is:

1. A seal ring for vehicles configured to seal an annular gap between a rotating shaft and a housing, the seal ring comprising:

a first ring accommodated in an annular groove formed in a peripheral surface of one of the rotating shaft and the housing and comprising a first peripheral surface sealingly contacting a bottom surface of the annular groove; and a second ring comprising a second peripheral surface sealingly contacting a peripheral surface of the other of the rotating shaft and the housing, wherein the first ring comprises a first facing surface at an opposite side of the first peripheral surface in a radial direction, the second ring comprises a second facing surface at an opposite side of the second peripheral surface in the radial direction, and the first facing surface and the second facing surface face each other, and wherein one of the first facing surface and the second facing surface comprises a convex portion, and the other of the first facing surface and the second facing surface comprises a concave portion engaging the convex portion, and wherein the first ring comprises a first outer end surface and a second outer end surface in an axial direction, and a first lateral end surface of a side of the first outer end surface and a second lateral end surface of a side of the second outer end surface forming lateral end surfaces of one of the convex portion and the concave portion, and wherein the second ring comprises a first outer end surface and a second outer end surface in the axial direction, and a first lateral end surface of a side of the first outer end surface and a second lateral end surface of a side of the second outer end surface forming lateral end surfaces of the other of the convex portion and the concave portion, and wherein the first lateral end surface of the first ring and the first lateral end surface of the second ring are configured to abut each other by fluid pressure acting in the axial direction, and wherein a length from the first lateral end surface of the second ring to the first outer end surface of the second ring is longer than a length from the first lateral end surface of the first ring to the first outer end surface of the first ring.

2. The seal ring according to claim 1, wherein the first ring is configured symmetrically in the axial direction with respect to a first center line perpendicular to a center line of the rotating shaft, and the second ring is configured symmetrically in the axial direction with respect to a second center line perpendicular to the center line of the rotating shaft.

3. The seal ring according to claim 2, wherein:

the first ring comprises a first cut face extending parallel to the center line of the rotating shaft from the first outer end surface in the axial direction to the first center line, a second cut face extending parallel to the center line of the rotating shaft from the second outer end surface in the axial direction to the first center line, and a third cut face extending along the first center line and connecting the first cut face of the first ring and the second cut face of the first ring, and the second ring comprises a first cut face extending parallel to the center line of the rotating shaft from the first outer end surface in the axial direction to the second center line, a second cut face extending parallel to the center line of the rotating shaft from the second outer end surface in the axial direction to the second center line, and a third cut face extending along the second center line and connecting the first cut face of the second ring and the second cut face of the second ring.

4. The seal ring according to claim 1, wherein the rotating shaft is a component of a transmission and includes a helical gear.

5. The seal ring according to claim 1, wherein the annular gap comprises a first annular gap communicating with a first space into which hydraulic oil from a hydraulic pump driven by a prime mover is introduced and a second annular gap communicating with a second space, and the seal ring is placed between the first annular gap and the second annular gap so as to prevent leaking of oil from the first space to the second space.

6. The seal ring according to claim 5, wherein the seal ring moves to a first axial direction by the hydraulic oil from the hydraulic pump when driving of the prime mover is started, and the rotating shaft moves to a second axial direction opposite to the first axial direction relatively with respect to the housing when driving of the prime mover is stopped.

\* \* \* \* \*